Sept. 1, 1936.    L. SCHLEIER    2,052,726
METALLIC ICE CREAM CONTAINER JACKET FOR REFRIGERATORS
Filed Oct. 11, 1934

Inventor
Louis Schleier
By Miller & Miller
Attorneys

Patented Sept. 1, 1936

2,052,726

UNITED STATES PATENT OFFICE 2,052,726

METALLIC ICE CREAM CONTAINER JACKET FOR REFRIGERATORS

Louis Schleier, New York, N. Y.

Application October 11, 1934, Serial No. 747,936

3 Claims. (Cl. 220—9)

This invention relates to a metallic ice cream container jacket for refrigerators and has for an object to provide a metallic jacket to be used in the cell of ice cream mechanical refrigerators so as to reinforce the cardboard container in which both brick and bulk ice cream are nowadays packed and further to assist in keeping the ice cream in the proper chilled condition.

Bulk ice cream, brick ice cream, and ice cream rolls nowadays are delivered by the manufacturer to the dealer in cardboard or similar containers of various sizes and shapes such as two-and-one-half gallons, five gallons, etc., and the container may be circular in cross section or hexagonal or other shape in cross section. The dealer then places this cardboard container and the ice cream therein in the cell of the mechanical refrigerator. It has been found from experience and practice that the ice cream in a cardboard container does not retain its compactness due to the fact that the cardboard container enclosing the ice cream is a poor heat conducting medium and hence will not absorb the cold so easy from the mechanical refrigerator. In addition, the act of scooping ice cream out of the container places an increased burden on the container, frequently distorting it and sometimes even breaking it down.

With this invention, however, a cardboard container is substantially reinforced so that it cannot break down under normal usage and further is placed in substantial contact with the metallic reinforcing jacket which, being of metal, absorbs the cold of the mechanical refrigerator and transmits it more readily to the cardboard container and the contained ice cream than heretofore.

Figure 1:
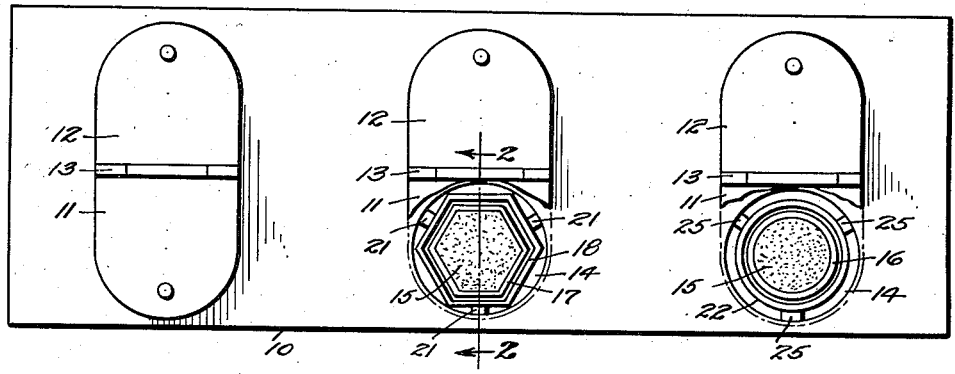
Figure 2:
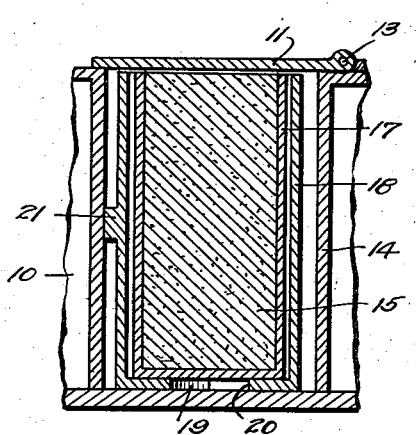
Figure 3:
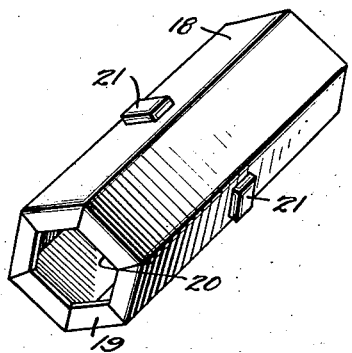
Figure 4:
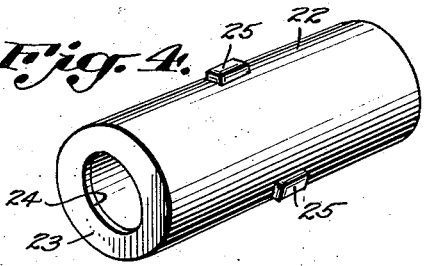

With the foregoing and other objects in view, as will hereinafter become apparent, this invention comprises the constructions, combinations and arrangements of parts hereinafter set forth, disclosed and shown on the accompanying drawing. In this drawing, Figure 1 is a plan view of a soda fountain mechanical refrigerator, two of the cover plates being broken away to show the invention therein, Figure 2 is a sectional view taken on the line 2—2 of Figure 1, Figure 3 is a perspective view of the invention, and Figure 4 is a perspective view of another form of the invention.

There is shown at 10 a conventional representation of a refrigerator for holding ice cream such as used at soda fountain stores where the ice cream is sold either in bulk or in brick.

This refrigerator 10 is of the six cell size, each pair of cells being provided with a common hinged cover 11 and 12, hinged together as at 13 in the usual manner. The cells 14, as shown, are circular in cross section, but it will be obvious that they may be of any shape according to the whim of the manufacturer.

Ordinarily, the ice cream 15, here shown as bulk ice cream, is packed in a cardboard or similar container of the desired size, the container being of any desired cross sectional shape such as circular as at 16, hexagonal as at 17 or any other desired shape. The containers 16 or 17 while here shown as containing bulk ice cream 15, are likewise used for containing brick ice cream in packages. When the container 16 or 17 is delivered to the dealer he places it in the individual cells 14 of the refrigerator 10. When thus placed in the cell, however, it has been found that the ice cream whether bulk or brick tends to soften in spite of the cold air surrounding the container within the cell. This is due to the fact that the cardboard container is in itself a poor heat exchange medium and hence it serves to insulate the ice cream from the cold within the cell. Furthermore, due to the substantial space left between the sides of the container and the sides of the cell 14, the container tends to get out of shape and to break down as the ice cream, especially the bulk ice cream, is scooped thereout during the process of selling it.

This invention provides a jacket adapted to be placed in the cell 14 and to receive the container with the ice cream therein, the jacket being shaped to correspond to the shape of the container. When the container is hexagonal in shape as at 17 the jacket 18 is provided which it will be observed is of a corresponding hexagonal cross section. The jacket 18 is open at its top and is provided with an internally projecting flange 19 at its bottom apertured as at 20.

The internal diameter of the container 18 is substantially that of the external diameter of the container 17 so that the container 17 will fit therein in substantial contact therewith. The flange 19 supports the bottom of the container 17, while the aperture 20 provides an air space at the bottom thereof. In addition, when the container 17 is emptied, the air space provided by the aperture 20 facilitates the removal of the container for the condensation of moisture may cause the sides of the container 17 to adhere to the inside of the jacket 18. When this happens, and it is desired to remove the emptied container 17, it is possible due to the aperture 20 to easily puncture the bottom thereof so as to get a secure grip on the container 11 and tear it away if necessary from the inside of the jacket 18.

In order that the jacket 18 may remain properly centralized within the cell 14 it is provided with a plurality of contacts 21 on the side thereof which come into contact with the inside of the cell 14 and properly position the jacket 18 and the container 17 within the cell.

When the ice cream container is circular in cross section as at 16 then a jacket 22 is provided which is likewise circular in cross section, the jacket 22 being provided with a corresponding flange 23 correspondingly apertured as at 24 while contact members 25 spaced about the sides of the jacket 22 serve to properly position the jacket 22 and the container 16 within the cell 14. Although the jacket has been shown as being either circular or hexagonal in cross section, it will be understood that the shape of the jacket will correspond to the shape of the ice cream container inasmuch as some dealers pack their ice cream in containers of one shape and other dealers pack their ice cream in containers of other shapes. In addition, some dealers may prefer to pack their bulk ice cream in one shape of container and their brick ice cream in another shape of container, or in addition may pack different flavors of ice cream in different shapes of containers, and to provide for this contingency the metallic jacket of this invention will be shaped to correspond to the shape of the container furnished by the dealer.

As shown in Figure 1, the mechanical refrigerator 10 is provided with metallic jackets of two shapes corresponding to the shape of the ice cream containers presumably received from different ice cream manufacturers. The remaining cells 14 within this refrigerator 10 may contain jackets of still additional shapes beneath their covers 11 and 12.

The novel features and the operation of this device will be apparent from the foregoing description. While the device has been shown and the structure described in detail, it is obvious that this is not to be considered limited to the exact form disclosed but that changes may be made therein within the scope of what is claimed without departing from the spirit of the invention.

Having thus set forth and disclosed the nature of this invention, what is claimed is:

1. For use in reinforcing an ice cream cardboard container within a refrigerator cell and for retaining the container in proper chilled condition, a metallic reinforcing jacket, said jacket being open at the top to permit the ice cream cardboard container to be placed therein, an internally projecting apertured flange at the bottom to support the ice cream container thereon, said container fitting snugly within said jacket, and centralizing means on said jacket comprising a plurality of metallic contacts spaced about the external surface of said jacket.

2. For use in reinforcing an ice cream cardboard container within a refrigerator cell and for retaining the container in proper chilled condition, a metallic reinforcing jacket, said jacket being open at the top to permit the ice cream cardboard container to be placed therein, an internally projecting apertured flange at the bottom to support the ice cream container thereon, said container fitting snugly within said jacket, and centralizing means on said jacket comprising a plurality of metallic contacts spaced about the external surface of said jacket, said jacket being circular in cross section in correspondence with the shape of the ice cream cardboard container.

3. For use in reinforcing an ice cream cardboard container within a refrigerator cell and for retaining the container in proper chilled condition, a metallic reinforcing jacket, said jacket being open at the top to permit the ice cream cardboard container to be placed therein, an internally projecting apertured flange at the bottom to support the ice cream container thereon, said container fitting snugly within said jacket, and centralizing means on said jacket comprising a plurality of metallic contacts spaced externally about the sides of said jacket, said jacket being angular in shape corresponding with the shape of the ice cream cardboard container.

LOUIS SCHLEIER.